W. BROOKS.
Hop-Picking Box.

No. 200,892. Patented March 5, 1878.

Witnesses:
M. Surray
S. P. Cool

Inventor:
William Brooks
by M. Bailey
his attorneys

UNITED STATES PATENT OFFICE.

WILLIAM BROOKS, OF MIDDLEFIELD, ASSIGNOR TO J. WARREN LAMB, OF OTSEGO, NEW YORK.

IMPROVEMENT IN HOP-PICKING BOXES.

Specification forming part of Letters Patent No. 200,892, dated March 5, 1878; application filed February 6, 1878.

*To all whom it may concern:*

Be it known that I, WILLIAM BROOKS, of Middlefield, Otsego county, New York State, have invented certain new and useful Improvements in Hop-Picking Boxes, of which the following is a specification:

My invention is directed to an appliance designed for use in harvesting hops.

One of the most imperative necessities in hop-harvesting is to obtain the hops clean and free from leaves and stems. The intermixture of these and other extraneous matters with the hops as they are harvested has, however, been a source of great difficulty to the raiser. There have usually been employed, for the purpose of receiving the hops as they are gathered from the vines by the laborers, open boxes, stationed in the field at convenient points. The picker or laborer places the vine upon a table close by the box, and then removes the hops from the vine and drops them into the box. It is impossible by this method to secure the hops in any degree clear of stems and leaves, and heretofore these foreign and injurious matters have been removed by hand—a slow and tedious process, and never more than half performed at the best.

The object I have in view is to obviate this difficulty, and to enable the raiser to gather his crop free from these injurious substances. To this end I apply to the top of the box a screen, upon which the hops, as they are gathered, are thrown, the effect being to allow the hops, as they fall upon the screen from the hands of the picker, to fall through the screen into the box, and to retain upon the screen the stems and leaves, where they can be removed and thrown away as they accumulate.

I thus entirely obviate the difficulty above specified, and enable the picker to obtain in a given time far more hops in required condition than has heretofore been practicable, the time previously used in picking out the stems and leaves by hand being now available for hop-picking.

The accompanying drawings represent a hop-harvesting box made in accordance with my invention.

Figure 1:
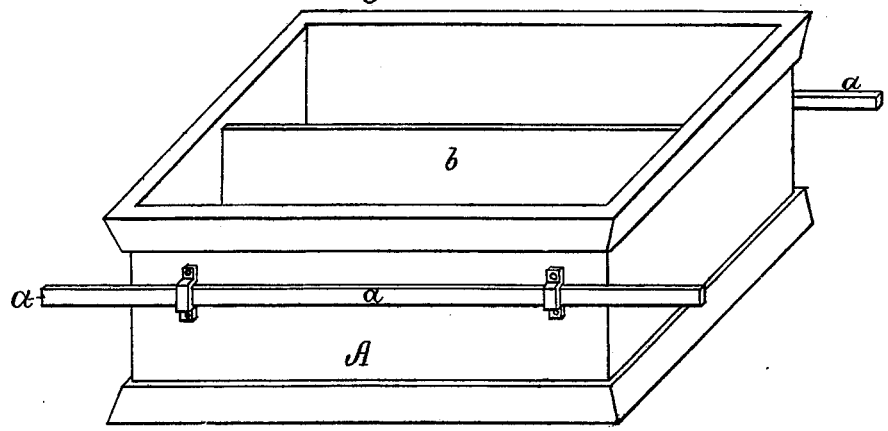
Figure 2:
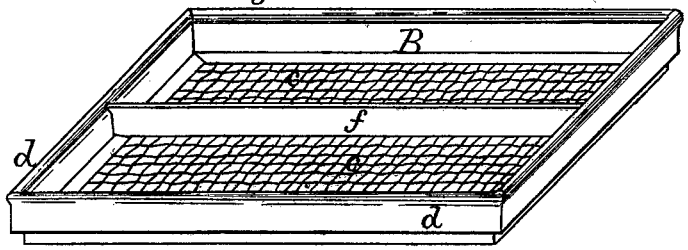
Figure 3:
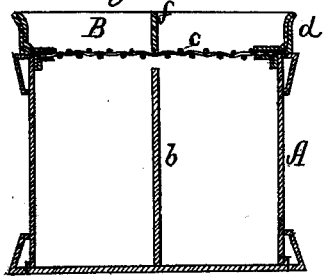

Figure 1 is a perspective view of the box with screen removed. Fig. 2 is a like view of the screen detached. Fig. 3 is a transverse vertical section of the box with the screen in place.

A is the box, provided with handles $a$, by which it may be lifted and carried from point to point. It is designed for two pickers, and is divided by a longitudinal vertical partition, $b$, into two compartments.

B is the screen, the body being formed of interwoven or interlaced wire, $c$, of suitable mesh, with a surrounding ledge or raised rim, $d$, and a longitudinal dividing-partition, $f$, corresponding to the lower box-partition $b$.

The screen is removable from the box, and fits snugly in or upon the top of the box as a cover to the same.

The manner of using the box and the results due to my improvement have above been explained, and require no repetition.

What I claim, and desire to secure by Letters Patent, is—

The described improved hop harvesting or picking box, consisting of the hop-harvesting box proper, provided with a removable screen-cover, adapted to permit the passage therethrough of the hops, and to retain the twigs, leaves, and other extraneous substances thrown upon the screen with the hops, as set forth.

In testimony whereof I hereunto affix my signature in presence of two witnesses.

WM. BROOKS.

Witnesses:
GEO. M. JARVIS,
S. M. CADY.